Figure 1:
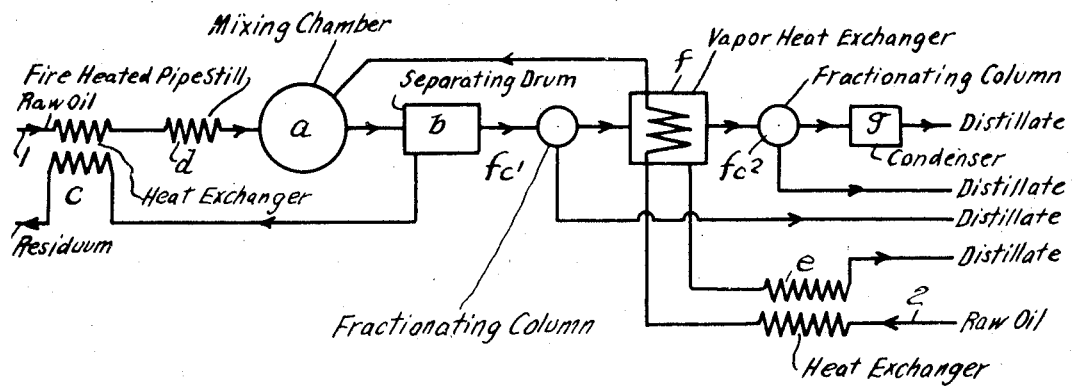

Oct. 21, 1930.  F. TINKER  1,779,222
DISTILLATION OF CRUDE OILS
Filed Feb. 9, 1927  2 Sheets-Sheet 1

INVENTOR
Frank Tinker
BY
Pennie, Davis, Marvin & Edmonds
ATTORNEYS

Oct. 21, 1930.   F. TINKER   1,779,222
DISTILLATION OF CRUDE OILS
Filed Feb. 9, 1927   2 Sheets-Sheet 2
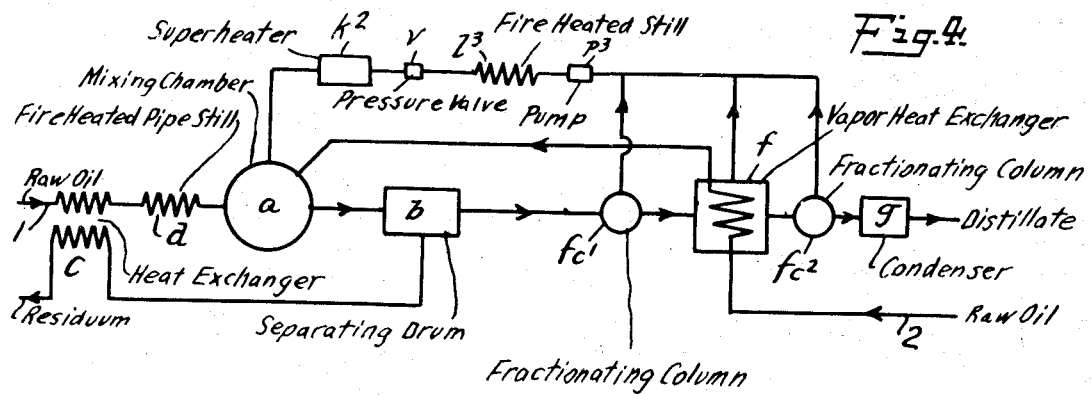
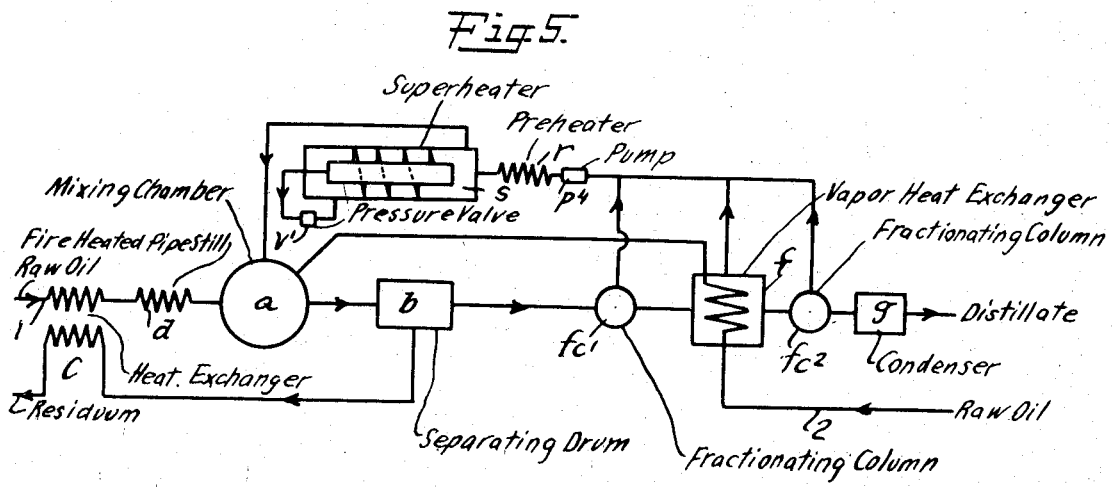
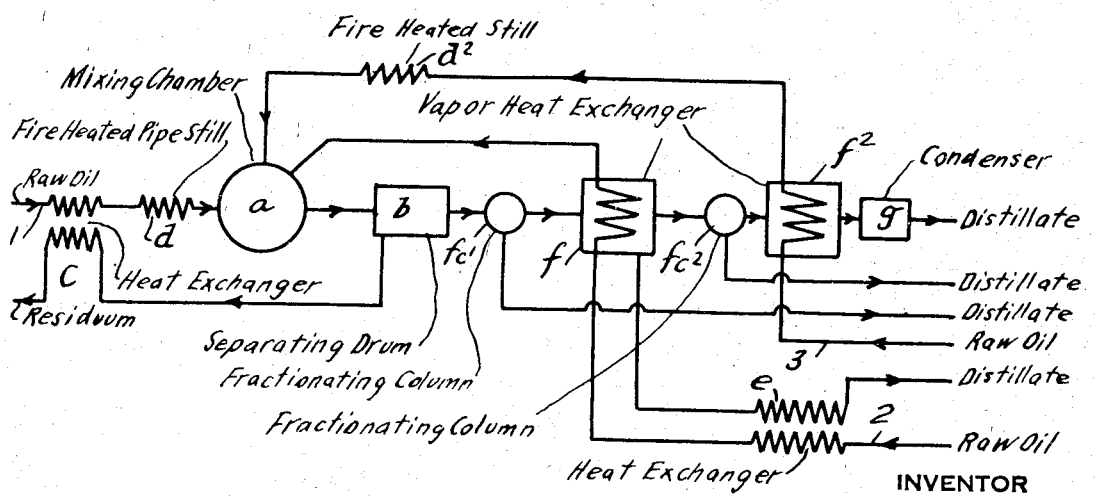
INVENTOR
Frank Tinker Patented Oct. 21, 1930

1,779,222

UNITED STATES PATENT OFFICE

FRANK TINKER, OF STREETLY, SUTTON COLDFIELD, ENGLAND, ASSIGNOR TO SINCLAIR REFINING COMPANY, OF NEW YORK, N. Y., A CORPORATION OF MAINE

DISTILLATION OF CRUDE OILS

Application filed February 9, 1927, Serial No. 167,047, and in Great Britain April 28, 1926.

In the distillation of crude oils, (including topped oils, fuel oils, and gas oils), shale oils, tars and the like, more particularly in what are known as topping plants, it is becoming increasingly common to use heat exchange apparatus for the purpose of economizing fuel and also reducing the amount of water cooling which is otherwise necessary.

The object of the present invention is to provide a distillation system in which heat exchange can be carried out more effectively and economically and to a further extent than is usual, and in such a way that the different parts of the plant are capable of independent control.

The invention comprises the use in the system, of a mixing chamber into which hot liquids or vapours or mixtures of liquid and vapour from different parts of the system are delivered and mixed so as to attain a common temperature prior to their entering a separating chamber for liquid and vapour, thus enabling outgoing heat derived from any part of the system to be returned to and usefully employed in the system.

In one application of the invention to a topping plant consisting of a fire-heated pipe-still, a mixing chamber, a separating chamber, a plurality of fractionating towers and fractional condensers, and a condenser for light distillates, hot residuum from the separating chamber is taken as heretofore through a heat exchanger in which crude oil before entering the pipe-still is subjected to a preliminary heating; hot refluxed oil from one or more of the fractional condensers is also passed through heat exchangers and caused to heat cold crude oil which is passed next through a coil or pipes inserted in the fractional condensers for further heating and is finally delivered to the mixing chamber where it mixes with the hot oil or vapour from the fire-heated still. Crude oil is thus used for cooling the contents of an effluents from the condensers and also for condensing the vapours, and is itself thereby heated to a temperature at which it can advantageously be mixed with the main stream flowing through the system.

The invention may also be applied to a system containing similar elements to those above described, in combination with a branch circuit containing an additional still and superheater, condensate from a fractional condenser being supplied to the still by a pump, and the hot vapour from the superheater being delivered to the mixing chamber.

A similar branch system to that above described may be used for cracking oil under pressure in the liquid phase, liquid being refluxed from any or all of the fractional condensers and forced by a pump through a pressure still and separating drum each working under any desired pressure. Cracked liquid residue is discharged from the branch circuit, and the cracked vapours are delivered into the mixing chamber of the main system. Alternatively the residue from the separating chamber of the system first described may be pumped through a still and separating drum, and the cracked vapours delivered into the mixing chamber.

By the use of a common mixing chamber, into which hot liquid or vapour or mixtures of liquid and vapour derived from different parts of the system can be delivered, I am able to utilize economically the heat given up in the cooling of distillates and residues, reduce initial cost and upkeep charges in the fire-heated part of the system, and generally effect important economies in the operation of distillation plants.

The six accompanying diagrams illustrate different modes of carrying my invention into effect.

Figure 1 shows a topping plant which is fed, instead of by one stream of crude oil as is usual, by two streams of crude oil merging after preheating in the manner outlined below, into the mixing chamber $a$. In this chamber the streams commingle at the top, and flow downwards over baffle plates into a separating drum $b$ wherein the liquid oils of the mixed stream are separated from the entangled vapours. The crude oil stream flowing in the pipe 1 is preheated on its way to the mixing chamber $a$ firstly by indirect heat exchange (in heat exchanger $c$) with the liquid residuum flowing from the separating drum, and secondly by a fire heated pipestill $d$, where it can be raised to any desired temperature immediately before entering $a$. The crude oil stream in the pipe 2 is preheated firstly by indirect heat exchange (in heat exchanger $e$) with the liquid distillate refluxed from the fractionating system, and secondly by a vapour heat exchanger $f$, in which considerable volumes of the medium and heavier vapours flowing from the separating drum towards the water condenser $g$ are fractionally condensed by means of a coil or pipes inserted therein through which flows the crude oil stream 2.

On either side of the fractional condenser or vapour heat exchanger $f$ it is convenient to place two fractionating columns $fc^1$, and $fc^2$, so that the grade of distillate condensed in $f$ can be controlled. $g$ in the diagrams is an ordinary water cooled condenser which condenses the light oils escaping liquefaction in $fc^1$ and $fc^2$.

It is clear that the coil or pipe area in $f$ can be made of such a size, and the amount of crude oil stream 2 regulated in such a way, that the desired amount of condensation of medium and/or heavy fractions can be obtained in $f$ and crude oil stream 2 raised to something like the desired distillation temperature before it commingles with the crude oil stream 1 in mixing chamber $a$. It is likewise clear that the temperature of the mixed stream can be controlled by imparting a little more or less heat as may be required to the crude oil stream 1 by means of the fire-heated pipestill $d$.

It is evident also that a supplementary indirect heat exchanger $f^2$ between condensing vapours and a further crude oil stream 3 may be placed in the vapour path between $fc^2$ and the water condenser $g$ as shown in Fig. 6. If this were done it is advisable to pass this third stream of crude oil through a pipestill $d^2$ before introducing it into the mixing chamber $a$.

Figure 2:
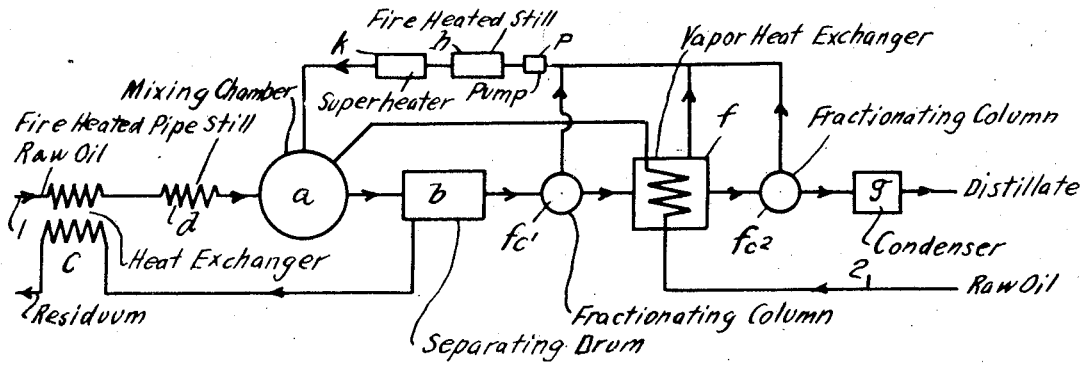

Figure 2 shows the above system of Figure 1 combined in principle with the system of my previous U. S. Patent No. 1,535,507. The liquid oil condensed in $f$ (together if desired with the refluxed oils from the columns $fc^1$ and $fc^2$) are introduced into a still $h$ (preferably by means of a pump $p$ working to any desired pressure), from which the vapours (at any desired pressure) are passed first to a superheater $k$ for cracking purposes and then forward to the chamber $a$ for the purpose of commingling with the crude oil streams so that a common temperature is attained before separation of oils and vapours commences in the drum $d$.

Figure 3:
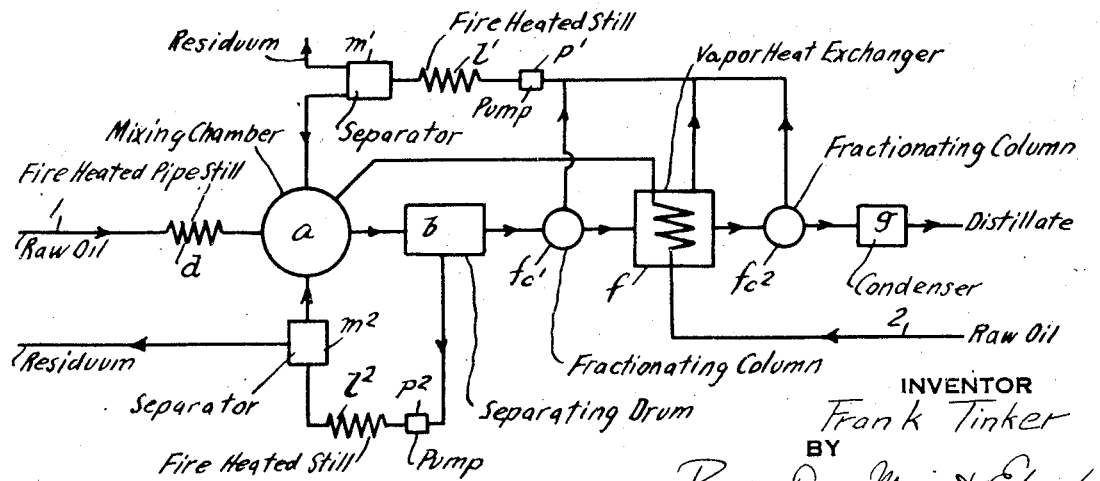

Figure 3 also shows the above system of Figure 1 combined with a system for cracking the refluxed oils from $f$ under pressure in the liquid phase by means of a coil or still $l^1$ supplied by a pump $p^1$, and also the cracking, under pressure in the liquid phase by means of a coil or still $l^2$, of the liquid residuum supplied from the separating drum $b$ by a pump $p^2$, either of these cracking systems being attached to the system of Figure 1 either singly or together. When this mode of operation is resorted to, it is advisable to insert in these cracking systems supplementary separating drums $m^1$ and $m^2$ wherein the cracked oils can be released from pressure, and from which the oils remaining liquid after pressure release can be withdrawn from the whole system immediately, the released vapours only passing into the chamber $a$ for commingling with the crude oil streams.

A further type of branch circuit (attached to the main system as heretofore) in which the cracking of refluxes is carried out partly in the liquid phase and partly afterwards in the vapour phase may be applied to the invention also. As shown in Figure 4 a loaded valve $v$ set to work at a pressure suitable for keeping the hydrocarbon oil in liquid state is placed in a position between the liquid phase cracking still $l^3$ (preferably of the pipestill pattern and supplied by a pump $p^3$) and a vapour superheater $k^2$ following it. Generally speaking the branch circuit separating drum can be dispensed with as the extent of cracking in the liquid phase need not be carried so far as is otherwise necessary for economical operation when the same hydrocarbon oil is to be further cracked subsequently in the vapour phase.

Furthermore, I find it convenient as shown in Figure 5, to employ a branch circuit for cracking refluxes which is built on the following lines. The refluxes are taken from the bottoms of the towers and forced by means of a pump $p^4$ through a preheater $r$ and then through a contrary flow superheater $s$ of similar design to that shown in my U. S. Patent No. 1,393,184. This superheater comprises an inner and outer tube the annular space between which contains a helical partition for causing the fluid to flow along a helical path. A loaded valve $v^1$ is however, placed at the point where the hydrocarbon oil returns in the space between the inner tube and the outer tube which latter is heated externally by fire. The loaded valve $v^1$ is set so as to keep the oil liquid or mostly so, whilst it is being heated in the preheater to say 400° C. or thereabouts and subsequently whilst it is picking up still more heat in its passage through the inner tube of the cracking chamber. After the oil leaves the loaded valve it wholly vapourizes in the space between the inner and outer tube where it is further cracked in the form of vapour.

It is evident that other methods of cracking involving superheating either in the liquid phase or vapour phase or both can be applied to the invention by means of a branch circuit.

For instance the insertion of a loaded valve at a point between the outlet of the contrary flow superheater *s* of Figure 5 and the mixing chamber *a* enables hydrocarbon oil to be heated in such a system in two pressure stages, both stages being liquid, or liquid and vapour consecutively, or liquid and foam consecutively as desired. In the case in which the hydrocarbon oil is kept liquid by pressure in both stages, much higher pressures than is now usual can be applied during the first stage to the oil flowing through *r* and the inner tube of *s*, since a pressure is also being applied to the outer surface of the inner tube of *s*. With suitable steel tubes it is possible to apply with safety pressures up to 1000 lbs. in *r*, and also in the inner tube of *s* if the oil in the space between the inner and outer tube of *s* is kept at a pressure round about 500 lbs.

Having thus described my invention what I claim as new and desire to secure by Letters Patent is:—

1. In the distillation of mineral oils, the improvement which comprises passing one stream of raw oil through a fire heated heating zone into a mixing zone and heating the oil to a distillation temperature in this heating zone, introducing a hot oil mixture including this thus heated raw oil from the mixing zone into a separating zone, discharging residuum from this separating zone, taking off vapors from the separating zone and partially condensing these vapors by heat exchange with an independent stream of the same raw oil, and introducing this thus heated independent stream of raw oil into the mixing zone there for the first time to merge with the first mentioned stream of raw oil.

2. In a distillation of mineral oils, the improvement which comprises passing one stream of raw oil through a fire heated heating zone into a mixing zone and heating the oil to a distillation temperature in this heating zone, introducing a hot oil mixture including this thus heated raw oil from the mixing zone into a separating zone, discharging residuum from this separating zone, taking off vapors from the separating zone and partially condensing these vapors by heat exchange with an independent stream of the same raw oil, passing this independent stream of raw oil in heat exchange with condensate from this partial condensation before the just mentioned heat exchange and introducing this thus heated independent stream of raw oil into the mixing zone there for the first time to merge with the first mentioned stream of raw oil.

3. In the distillation of mineral oils, the improvement which comprises passing one stream of raw oil through a fire heated heating zone into a mixing zone and heating the oil to a distillation temperature in this heating zone, introducing a hot oil mixture including this thus heated raw oil from the mixing zone into a separating zone, discharging residuum from this separating zone, taking off vapors from the separating zone and partially condensing these vapors by heat exchange with an independent stream of raw oil, introducing this thus heated independent stream of raw oil into the mixing zone there for the first time to merge with the first mentioned stream of raw oil, and passing residuum discharged from the separating zone in heat exchange with the first mentioned stream of raw oil before this raw oil enters the heating zone.

4. In the distillation of mineral oils, the improvement which comprises passing one stream of raw oil through a fire heated heating zone into a mixing zone and heating the oil to a distillation temperature in this heating zone, introducing a hot oil mixture including this thus heated raw oil from the mixing zone into a separating zone, discharging residuum from this separating zone, taking off vapors from the separating zone and partially condensing these vapors by heat exchange with an independent stream of raw oil, passing this independent stream of raw oil in heat exchange with condensate from this partial condensation before the just mentioned heat exchange, introducing this thus heated independent stream of raw oil into the mixing zone there for the first time to merge with the first mentioned stream of raw oil, and passing residuum discharged from the separating zone in heat exchange with the first mentioned stream of raw oil before this raw oil enters the heating zone.

5. In the distillation of mineral oils, the improvement which comprises passing one stream of raw oil through a fire heated heating zone into a mixing zone and heating the oil to a distillation temperature in this heating zone, introducing a hot oil mixture including this thus heated raw oil from the mixing zone into a separating zone, discharging residuum from this separating zone, taking off vapors from the separating zone and partially condensing these vapors by heat exchange with an independent stream of raw oil, introducing this thus heated independent stream of raw oil into the mixing zone there for the first time to merge with the first mentioned stream of raw oil, passing condensate from the partial condensation through a separate fire heated heating zone and heating it to a cracking temperature therein, an introducing resulting hot oil products into the mixing zone.

6. In the distillation of mineral oils, the improvement which comprises passing one stream of raw oil through a fire heated heating zone into a mixing zone and heating the oil to a distillation temperature in this heating zone, introducing a hot oil mixture including this thus heated raw oil from the mixing zone into a separating zone, discharging residuum from this separating zone, taking off vapors from the separating zone and partially condensing these vapors by heat exchange with an independent stream of raw oil, introducing this thus heated independent stream of raw oil into the mixing zone there for the first time to merge with the first mentioned stream of raw oil, passing condensate from the partial condensation through a separate fire heated heating zone and heating it to a cracking temperature therein, introducing resulting hot oil products into the mixing zone, and passing residuum discharged from the separating zone in heat exchange with the first mentioned stream of raw oil before this raw oil enters the heating zone.

7. In the distillation of mineral oils, the improvement which comprises passing one stream of raw oil through a fire heated heating zone into a mixing zone and heating the oil to a distillation temperature in this heating zone, introducing a hot oil mixture including this thus heated raw oil from the mixing zone into a separating zone, discharging residuum from this separating zone, taking off vapors from the separating zone and partially condensing these vapors by heat exchange with an independent stream of raw oil, introducing this thus heated independent stream of raw oil into the mixing zone there for the first time to merge with the first mentioned stream of raw oil, passing condensate from the partial condensation through a separate fire heated heating zone and heating it to a cracking temperature therein, introducing resulting hot oil products into a second separating zone and discharging residuum therefrom, and introducing the vapors from this second separating zone into the mixing zone.

8. In the distillation of mineral oils, the improvement which comprises passing one stream of raw oil through a fire heated heating zone into a mixing zone and heating the oil to a distillation temperature in this heating zone, introducing a hot oil mixture including this thus heated raw oil from the mixing zone into a separating zone, discharging residuum from this separating zone, taking off vapors from the separating zone and partially condensing these vapors by heat exchange with an independent stream of raw oil, introducing this thus heated independent stream of raw oil into the mixing zone there for the first time to merge with the first mentioned stream of raw oil, passing residuum discharged from the separating zone through a separate fire heated heating zone and heating it to a cracking temperature therein, and introducing resulting hot oil products into the mixing zone.

9. In the distillation of mineral oils, the improvement which comprises passing one stream of raw oil through a fire heated heating zone into a mixing zone and heating the oil to a distillation temperature in this heating zone, introducing a hot oil mixture including this thus heated raw oil from the mixing zone into a separating zone, discharging residuum from this separating zone, taking off vapors from the separating zone and partially condensing these vapors by heat exchange with an independent stream of raw oil, introducing this thus heated independent stream of raw oil into the mixing zone there for the first time to merge with the first mentioned stream of raw oil, passing residuum discharged from the separating zone through a separate fire heated heating zone and heating it to a cracking temperature therein, introducing resulting hot oil products into a second separating zone and discharging residuum therefrom and introducing the vapors from this second separating zone into the mixing zone.

10. In the distillation of mineral oils, the improvement which comprises passing one stream of raw oil through a fire heated heating zone into a mixing zone and heating the oil to a distillation temperature in this heating zone, introducing a hot oil mixture including this thus heated raw oil from the mixing zone into a separating zone, discharging residuum from this separating zone, taking off vapors from the separating zone and partially condensing these vapors by heat exchange with an independent stream of raw oil, introducing this thus heated independent stream of raw oil into the mixing zone there for the first time to merge with the first mentioned stream of raw oil, passing condensate from the partial condensation through a second fire heated heating zone and heating it to a cracking temperature therein, introducing resulting hot oil products into the mixing zone, passing residuum discharged from the separating zone through a separate fire heated heating zone and heating it to a cracking temperature therein, and introducing resulting hot oil products into the mixing zone.

11. In the distillation of mineral oil, the improvement which comprises passing one stream of raw oil through a fire heated heating zone into a mixing zone and heating the oil to a distillation temperature in this heating zone, introducing a hot oil mixture including this thus heated raw oil from the mixing zone into a separating zone, discharging residuum from this separating zone, taking off vapors from the separating zone and partially condensing these vapors by heat exchange with an independent stream of the same raw oil, introducing this thus heated independent stream of raw oil into the mixing zone there for the first time to merge with the first mentioned stream of raw oil, subjecting vapors from this partial condensation to further heat exchange with another independent stream of the same raw oil, passing this thus heated stream of raw oil through a separate fire heated heating zone and heating it to a distillation temperature in this separate heating zone, and introducing this thus heated stream of raw oil into the mixing zone there for the first time to merge with the first mentioned and second mentioned streams of raw oil.

12. In the distillation of mineral oils, the improvement which comprises passing one stream of raw oil through a fire heated heating zone into a mixing zone and heating the oil to a distillation temperature in this heating zone, introducing a hot oil mixture including this thus heated raw oil from the mixing zone into a separating zone, discharging residuum from this separating zone, taking off vapors from the separating zone and partially condensing these vapors by heat exchange with an independent stream of raw oil, introducing this thus heated independent stream of raw oil into the mixing zone there for the first time to merge with the first mentioned stream of raw oil, subjecting vapors from this partial condensation to further heat exchange with another independent stream of raw oil, passing this thus heated stream of raw oil through a separate fire heated heating zone and heating it to a distillation temperature in this separate heating zone, and introducing this thus heated stream of raw oil into the mixing zone there for the first time to merge with the first mentioned and second mentioned streams of raw oil.

13. In the distillation of mineral oils, the improvement which comprises passing one stream of raw oil through a fire heated heating zone into a mixing zone and heating the oil to a distillation temperature in this heating zone, introducing a hot oil mixture including this thus heated raw oil from the mixing zone into a separating zone, discharging residuum from this separating zone, taking off vapors from the separating zone and partially condensing these vapors by heat exchange with an independent stream of raw oil, introducing this thus heated independent stream of raw oil into the mixing zone there for the first time to merge with the first mentioned stream of raw oil, passing condensate from this partial condensation through a separate fire heated heating zone and heating it to a cracking temperature under superatmospheric pressure therein, and introducing resulting hot oil products into the mixing zone.

14. In the distillation of mineral oils, the improvement which comprises passing one stream of raw oil through a fire heated heating zone into a mixing zone and heating the oil to a distillation temperature in this heating zone, introducing a hot oil mixture including this thus heated raw oil from the mixing zone into a separating zone, discharging residuum from this separating zone, taking off vapors from the separating zone and partially condensing these vapors by heat exchange with an independent stream of raw oil, introducing this thus heated independent stream of raw oil into the mixing zone there for the first time to merge with the first mentioned stream of raw oil, passing condensate from this partial condensation through a separate fire heated heating zone and heating it to a cracking temperature under superatmospheric pressure therein, introducing resulting hot oil products into a second separating zone and discharging residuum therefrom, and introducing the vapors from this second separating zone into the mixing zone.

15. In the distillation of mineral oils, the improvement which comprises passing one stream of raw oil through a fire heated heating zone into a mixing zone and heating the oil to a distillation temperature in this heating zone, introducing a hot oil mixture including this thus heated raw oil from the mixing zone into a separating zone, discharging residuum from the separating zone, taking off vapors from the separating zone and partially condensing these vapors by heat exchange with an independent stream of raw oil, introducing this thus heated independent stream of raw oil into the mixing zone there for the first time to merge with the first mentioned stream of raw oil, passing condensate from this partial condensation through a separate fire heated heating zone and heating it to a cracking temperature under superatmospheric pressure therein, introducing resulting hot oil products into the mixing zone, and passing residuum discharged from the separating zone in heat exchange with the first mentioned stream of raw oil before this raw oil enters the heating zone.

16. In the distillation of mineral oils, the improvement which comprises passing one stream of raw oil through a fire heated heating zone into a mixing zone and heating the oil to a distillation temperature in this heating zone, introducing a hot oil mixture including this thus heated raw oil from the mixing zone into a separating zone, discharging residuum from this separating zone, taking off vapors from the separating zone and partially condensing these vapors by heat exchange with an independent stream of raw oil, introducing this last mentioned stream of raw oil into the mixing zone there for the first time to merge with the first mentioned stream of raw oil, passing condensate from this partial condensation through a fire heated heating zone separate from the first mentioned heating zone and heating it to a cracking temperature therein, introducing resulting hot oil products into the mixing zone, and passing residuum discharged from the separating zone in heat exchange with the first mentioned stream of raw oil before this raw oil enters the first mentioned heating zone.

17. In the distillation of mineral oils, the improvement which comprises passing one stream of raw oil through a fire heated heating zone into a mixing zone and heating the oil to a distillation temperature in this heating zone, introducing a hot oil mixture including this thus heated raw oil from the mixing zone into a separating zone, discharging residuum from this separating zone, taking off vapors from the separating zone and partially condensing these vapors by heat exchange with an independent stream of raw oil, introducing this last mentioned stream of raw oil into the mixing zone there for the first time to merge with the first mentioned stream of raw oil, passing condensate from this partial condensation through a fire heated heating zone separate from the first mentioned heating zone and heating it to a cracking temperature under superatmospheric pressure therein, releasing the pressure on the resulting hot oil products and introducing them into the mixing zone, and passing residuum discharged from the separating zone in heat exchange with the first mentioned stream of raw oil before this raw oil enters the first mentioned heating zone.

18. In the distillation of mineral oils, the improvement which comprises passing a stream of crude oil through a fire heated heating zone into a mixing zone and heating the oil to a distillation temperature in this heating zone, introducing a hot oil mixture including this heated crude oil from the mixing zone into a separating zone, discharging residuum from this separating zone and passing this residuum in heat exchange with the first mentioned stream of crude oil before this crude oil enters the first mentioned heating zone, taking off vapors from the separating zone and partially condensing these vapors by heat exchange with an independent stream of raw oil, introducing this last mentioned stream of raw oil into the mixing zone there for the first time to merge with the first mentioned stream of crude oil, passing condensate from this partial condensation through a fire heated heating zone separate from the first mentioned heating zone and through which no residuum passes, heating it to a cracking temperature under superatmospheric pressure therein, and releasing the pressure on the resulting hot oil products and introducing them into the mixing zone.

In testimony whereof I have signed my name to this specification.

FRANK TINKER.